United States Patent [19]

Patel

[11] Patent Number: 5,616,635
[45] Date of Patent: Apr. 1, 1997

[54] AQUEOUS MULTICOLOR PAINT

[75] Inventor: Kantilal D. Patel, Loveland, Ohio

[73] Assignee: The Goodyear Tire & Rubber Company, Akron, Ohio

[21] Appl. No.: 562,676

[22] Filed: Nov. 27, 1995

[51] Int. Cl.$^6$ ............................... C08L 1/28; C08K 3/34
[52] U.S. Cl. ...................... 524/37; 524/42; 524/43; 524/44; 524/45; 524/46; 524/446
[58] Field of Search .................... 524/37, 38, 39, 524/40, 41, 42, 43, 44, 45, 46, 446, 457, 458

[56] References Cited

U.S. PATENT DOCUMENTS

| | | | |
|---|---|---|---|
| 4,376,654 | 3/1983 | Zola | 524/37 |
| 4,968,741 | 11/1990 | Burroway et al. | 524/710 |
| 5,122,566 | 6/1992 | Burroway et al. | 524/710 |

Primary Examiner—Peter A. Szekely
Attorney, Agent, or Firm—Alvin T. Rockhill

[57] ABSTRACT

The present invention discloses a multicolor paint formulation which is comprised of:

(1) from about 5 to about 30 weight percent of a neutralized latex made by a method which comprises (A) free radical aqueous emulsion polymerizing at a pH of less than about 3.5 a monomer mixture which comprises, based on 100 weight percent monomers: (a) from about 45 to about 85 weight percent vinyl aromatic monomers, (b) from about 15 to about 50 weight percent of at least one alkyl acrylate monomer, and (c) from about 1 to about 6 weight percent of at least one unsaturated carbonyl compound; in the presence of about 0.5 to 4.0 phm at least one phosphate ester surfactant and in the presence of about 0.5 to 4.0 phm of at least one water insoluble nonionic surface active agent to produce a latex, and (B) neutralizing the latex with ammonia to a pH which is within the range of about 7 to about 10.5 to produce the neutralized latex;

(2) from about 0.5 to about 10 weight percent of hectorite clay;

(3) from about 0.05 to about 1 weight percent of a cellulosic thickener;

(4) from about 0.5 to about 10 weight percent of at least two pigments;

(5) from about 0.5 to about 10 weight percent of an organic solvent;

(6) from about 0.05 to about 2 weight percent of a plasticizer; and (7) from about 37 weight percent to about 93.4 weight percent water.

16 Claims, No Drawings

AQUEOUS MULTICOLOR PAINT

BACKGROUND OF THE INVENTION

Multicolor paints are used to coat surfaces where it is desirable for more that one color to appear in the coating. Generally there is a prominent color with speckles, streaks, or blotches of one or more additional colors dispersed therein. A wallpaper like appearance can be created by the utilization of multicolor paints. However, multicolor paints can be applied to many substrates where it would not be possible or practical to put wallpaper. For instance multicolor paints can be easily applied irregular surfaces and can be utilized in exterior applications. In fact, multicolor paints offer significant advantages as coatings for rough surfaces. Multicolor paints can also normally be applied at a lower cost than wallpaper.

Multicolor paints are widely used by professional painters in commercial and industrial settings. For example, multicolor paints are currently being used on a significant scale in painting commercial and public buildings, stadiums, and arenas. Multicolor paints can additionally be employed in painting vehicles, equipment, bridges, signs, and other types of structures. However, multicolor paints are not currently being employed to a significant extent by do-it-yourself painters. Since home owners often paint their own homes, multicolor paints are not widely used in painting private homes. Nevertheless, there is a large potential for utilizing multicolor paints in interior and exterior household applications.

Today most multicolor paints function on the basis of water/solvent incompatibility. This incompatibility keeps the different colors separated, thus creating a multicolor system with one application of the paint. Such multicolor paint formulations of necessity contain one or more organic solvents. A serious disadvantage of organic solvents is that they can be toxic, flammable and environmental pollutants. With the current escalation of environmental concerns, there is a need to reduce or eliminate the amount of organic solvents employed in paint formulations.

U.S. Pat. No. 4,968,741 and U.S. Pat. No. 5,122,566 disclose a latex which can be employed in manufacturing water reducible paints and paints made therewith which contain relatively small amounts of organic solvents, such as ethylene glycol n-butyl ether. U.S. Pat. No. 4,968,741 and U.S. Pat. No. 5,122,566 further disclose a process for producing a neutralized latex that is useful in the manufacture of water reducible coatings which comprises: (1) free radical aqueous emulsion polymerizing at a pH of less than about 3.5 a monomer mixture which comprises, based on 100 weight percent monomers: (a) from about 45 to about 85 weight percent vinyl aromatic monomers, (b) from about 15 to about 50 weight percent of at least one alkyl acrylate monomer, and (c) from about 1 to about 6 weight percent of at least one unsaturated carbonyl compound; in the presence of about 0.5 to 4.0 phm at least one phosphate ester surfactant and in the presence of about 0.5 to 4.0 phm of at least one water insoluble nonionic surface active agent to produce a latex; and (2) neutralizing the latex with ammonia to a pH which is within the range of about 7 to about 10.5 to produce the neutralized latex.

SUMMARY OF THE INVENTION

By utilizing the techniques of this invention, aqueous based multicolor paint formulations which do not function on the basis of water/solvent incompatibility can be manufactured. These multicolor paint formulations are more environmentally friendly than conventional formulations which function on the basis of water/solvent incompatibility. They also offer outstanding long term stability and can be easily applied to substrates with conventional sprayers. Coatings made with such multicolor paints also exhibit excellent scrubability, washability, water resistance, and color stability.

This invention more specifically discloses a multicolor paint formulation which is comprised of:

(1) from about 5 to about 30 weight percent of a neutralized latex made by a method which comprises (A) free radical aqueous emulsion polymerizing at a pH of less than about 3.5 a monomer mixture which comprises, based on 100 weight percent monomers: (a) from about 45 to about 85 weight percent vinyl aromatic monomers, (b) from about 15 to about 50 weight percent of at least one alkyl acrylate monomer, and (c) from about 1 to about 6 weight percent of at least one unsaturated carbonyl compound; in the presence of about 0.5 to 4.0 phm at least one phosphate ester surfactant and in the presence of about 0.5 to 4.0 phm of at least one water insoluble nonionic surface active agent to produce a latex, and (B) neutralizing the latex with ammonia to a pH which is within the range of about 7 to about 10.5 to produce the neutralized latex;

(2) from about 0.5 to about 10 weight percent of hectorite clay;

(3) from about 0.05 to about 1 weight percent of a cellulosic thickener;

(4) from about 0.5 to about 10 weight percent of at least two pigments;

(5) from about 0.5 to about 10 weight percent of an organic solvent;

(6) from about 0.05 to about 2 weight percent of a plasticizer; and (7) from about 37 weight percent to about 93.4 weight percent water.

The present invention also reveals a process for preparing a multicolor paint formulation which comprises the steps of:

(1) preparing a thickener solution by mixing from about 0.5 to about 10 parts by weight of a cellulosic thickener into 100 parts by weight of water;

(2) adding a sufficient quantity of a base to the thickener solution to produce a pH adjusted thickener solution having a pH which is within the range of about 7.5 to about 12;

(3) dispersing from about 15 to about 90 parts by weight of a first pigment into 100 parts by weight of the pH adjusted thickener solution to produce a first color imparting thickener solution;

(4) mixing about 50 to about 300 parts by weight of a neutralized latex, from about 5 to about 80 parts by weight of a solvent, from about 0.5 to about 20 parts by weight of a plasticizer, and from about 5 to about 80 parts by weight of an aqueous hectorite clay solution, into the first color imparting thickener solution to produce a first color imparting latex component; wherein said aqueous hectorite clay solution contains from about 1 to about 20 weight percent clay; and wherein said neutralized latex is made by a method which comprises (A) free radical aqueous emulsion polymerizing at a pH of less than about 3.5 a monomer mixture which comprises, based on 100 weight percent monomers: (a) from about 45 to about 85 weight percent vinyl aromatic monomers, (b) from about 15 to about 50 weight percent of at least one alkyl acrylate monomer, and (c) from about 1 to about 6 weight percent of at least one unsaturated carbonyl compound; in the presence of about 0.5 to 4.0 phm at least one phosphate ester surfactant and in the presence of about 0.5 to 4.0 phm of at least one water insoluble nonionic surface active agent to produce a latex, and (B) neutralizing the latex with ammonia to a pH which is within the range of about 7 to about 10.5 to produce the neutralized latex;

(5) dispersing from about 15 to about 90 parts by weight of a second pigment into 100 parts by weight of the pH adjusted thickener solution to produce a second color imparting thickener solution;

(6) mixing about 50 to about 300 parts by weight of a neutralized latex, from about 5 to about 80 parts by weight of a solvent, from about 0.5 to about 20 parts by weight of a plasticizer, and from about 5 to about 80 parts by weight of an aqueous hectorite clay solution, into the second color imparting thickener solution to produce a second color imparting latex component; wherein said aqueous hectorite clay solution contains from about 1 to about 20 weight percent clay; and wherein said neutralized latex is made by a method which comprises (A) free radical aqueous emulsion polymerizing at a pH of less than about 3.5 a monomer mixture which comprises, based on 100 weight percent monomers: (a) from about 45 to about 85 weight percent vinyl aromatic monomers, (b) from about 15 to about 50 weight percent of at least one alkyl acrylate monomer, and (c) from about 1 to about 6 weight percent of at least one unsaturated carbonyl compound; in the presence of about 0.5 to 4.0 phm at least one phosphate ester surfactant and in the presence of about 0.5 to 4.0 phm of at least one water insoluble nonionic surface active agent to produce a latex, and (B) neutralizing the latex with ammonia to a pH which is within the range of about 7 to about 10.5 to produce the neutralized latex; and (7) mixing the first color imparting latex component and the second color imparting latex component into a second hectorite clay solution to produce the multicolored paint formulation; wherein the second hectorite clay solution contains from about 0.5 to about 10 weight percent hectorite clay, wherein the weight ratio of the second hectorite clay solution to the sum of the first color imparting latex component and the second color imparting latex component is within the range of about 1:2 to about 4:1.

DETAILED DESCRIPTION OF THE INVENTION

The multicolor paint formulations of this invention are made by a special technique. The first step of this process involves making a thickener solution by mixing from about 0.5 parts by weight to about 10 parts by weight of a cellulosic thickener into 100 parts by weight of water. In most cases from about 1 to about 5 parts by weight of the cellulosic thickener will be mixed into the 100 parts of water. It is normally preferred for about 2 to about 3 parts by weight of the cellulosic thickener to be mixed into 100 parts by weight of water.

A pH adjusted thickener solution is then prepared. This is accomplished by adding a sufficient quantity of a base to the thickener solution to produce a pH adjusted thickener solution having a pH which is within the range of about 7.5 to about 12. A wide variety of bases can be utilized to adjust the pH of the thickener solution. It is normally preferred to employ ammonia as the base. The ammonia utilized will normally be in the form of ammonium hydroxide. In most cases the pH of the pH adjusted thickener solution will be adjusted to be within the range of about 8 to about 10. It is normally preferred for the pH adjusted thickener solution to have a pH which is within the range of about 8.3 to about 8.7.

A pigment is then dispersed into the pH adjusted thickener solution to make a color imparting thickener solution. Generally from about 15 parts by weight to about 90 parts by weight of the pigment will be mixed into 100 parts by weight of the pH adjusted thickener solution. In most cases from about 25 parts by weight to about 40 parts by weight of the pigment will be mixed into 100 parts by weight of the pH adjusted thickener solution. It is generally preferred to mix from about 30 parts by weight to about 35 parts by weight of the pigment into 100 parts by weight of the pH adjusted thickener solution to make the color imparting thickener solution.

A color imparting thickener solution will be made for every color that it is desired to incorporate into the multi-color paint formulation. Any pigment which is conventionally used in making water based paints can be employed in making the color imparting thickener solutions. Some representative examples of pigments which can be utilized include inorganic pigments such as, titanium dioxide, red iron oxide, yellow iron oxide, iron oxide black, and metallic oxide brown, and organic pigments such as phthalocyanine blue and phthalocyanine green.

Color imparting latex components are then made by mixing a neutralized latex, a solvent, a plasticizer, and a hectorite clay solution into the color imparting thickener solutions. Normally from about 50 parts by weight of the neutralized latex, from about 5 to about 80 parts by weight of the solvent, from about 0.5 to about 20 parts by weight of the plasticizer, and from about 5 to about 80 parts by weight of the aqueous hectorite clay solution will be mixed into the color imparting thickener solutions to make color imparting latex components.

It is generally preferred to mix from about 100 to about 200 parts by weight of neutralized latex into the color imparting thickener solutions. It is normally more preferred to mix from about 125 to about 175 parts by weight of neutralized latex into the color imparting thickener solutions.

The neutralized latices which can be utilized in making the paint formulations of this invention are prepared by free radical emulsion polymerization utilizing the techniques described in U.S. Pat. No. 4,968,741 and U.S. Pat. No. 5,122,566. The charge compositions used in the preparation of such neutralized latices contain monomers, at least one phosphate ester surfactant, at least one water insoluble nonionic surface active agent and at least one free radical initiator. The monomer charge composition used in such polymerizations is comprised of (a) from about 45 to about 85 weight percent vinyl aromatic monomers, (b) from about 15 to about 50 weight percent of at least one alkyl acrylate monomer, and (c) from about 1 to about 6 weight percent of at least one unsaturated carbonyl compound. It is preferred for the polymer being synthesized to be comprised of from about 60 to about 80 weight percent vinyl aromatic monomers, from about 20 to about 40 weight percent alkyl acrylate monomers, and from about 1.5 to about 5 weight percent unsaturated carbonyl compounds. It is more preferred for the polymer to be comprised of from about 65 weight percent to 75 weight percent vinyl aromatic monomers, from about 22 to about 30 weight percent alkyl acrylate monomers, and from about 2 to about 4 weight percent unsaturated carbonyl compounds.

Some representative examples of vinyl aromatic monomers which can be used include styrene, alpha-methyl styrene, and vinyl toluene. Styrene and alpha-methyl styrene are the preferred vinyl aromatic monomers. Due to its relatively low cost styrene is the most preferred vinyl aromatic monomer. The alkyl acrylate monomers which can be employed have alkyl moieties which contain from 2 to about 10 carbon atoms. The alkyl acrylate monomer will preferably have an alkyl moiety which contains from 3 to 5 carbon atoms. Normal butyl acrylate is a highly preferred alkyl acrylate monomer. Some representative examples of unsaturated carbonyl compounds which can be utilized include acrylic acid, methacrylic acid, fumaric acid, itaconic acid, maleic acid, and maleic anhydride. The preferred unsaturated carbonyl compounds include acrylic acid, methacrylic acid, fumaric acid, and itaconic acid. Acrylic acid and methacrylic acid are the most preferred unsaturated carbonyl compounds. In most cases, it is advantageous to use a combination of both acrylic acid and methacrylic acid as the unsaturated carbonyl compound component used in making the latex. For instance, the utilization of about 1 to about 3 weight percent acrylic acid with about 0.5 to about 1.5 weight percent methacrylic acid results in the latex having improved freeze-thaw stability. For example, the utilization of about 2% acrylic acid with 1% methacrylic acid as the unsaturated carbonyl compound component results in the latex produced being capable of withstanding more than five (5) freeze-thaw cycles. It is important for latices which are shipped through cold regions of the world to have this improved freeze-thaw stability.

The charge composition used in the preparation of the neutralized latex will contain a substantial quantity of water. The ratio between the total amount of monomers present in the charge composition and water can range between about 0.2:1 and about 1.2:1. It is generally preferred for the ratio of monomers to water in the charge composition to be within the range of about 0.8:1 and about 1.1:1. For instance, it is very satisfactory to utilize a ratio of monomers to water in the charge composition of about 1:1.

The charge composition will also contain from about 0.5 phm (parts per hundred parts of monomer) to about 4.0 phm of at least one phosphate ester surfactant. It is normally preferred for the phosphate-ester surfactant to be present in the polymerization medium at a level within the range of about 1 phm to about 3.5 phm. It is generally more preferred for the charge composition to contain from about 2 to about 3 phm of the phosphate ester surfactant.

The phosphate ester surfactants that are useful in this invention are commercially available from a wide variety of sources. For instance, GAF Corporation sells phosphate ester surfactants under the tradename of Gafac± RE-410, Gaftax± CD-169, and Gaftax± DP-100. Some other phosphate-ester surfactants that are commercially available include Indoil± (BASF Wyandotte Corporation), Emphos± (Witco Chemical Corporation), Cyclophos± (Cyclochemicals Corporation), Tryfac± (Emery Industries), and Alcamet± (Lonza, Inc.).

The phosphate ester surfactants used in making the neutralized latex can have the structural formula:

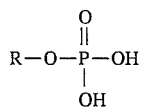

wherein R is an alkyl group or an aryl group. As a general rule, R will contain from about 4 to about 40 carbon atoms. It is preferred for such phosphate ester surfactants to be in the form of partially neutralized salts. Monobasic salts and nonionic compounds can be utilized as well as such dibasic salts. For example, Gafac± RE-410, which is a preferred phosphate ester surfactant, is a complex mixture of (1) a dibasic salt having the structural formula:

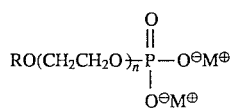

(2) a monobasic salt having the structural formula

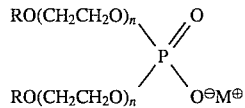

and (3) a nonionic compound having the structural formula:

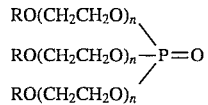

In the case of Gafac± RE-410, n is 4, and R represents nonyl phenol.

The charge composition used in the preparation of the latices of this invention also contains from about 0.5 phm to about 4 phm of at least one water insoluble nonionic surface active agent. The water insoluble nonionic surface active agent will preferably be present in the polymerization medium at a level within the range of about 1 phm to about 3.5 phm and will more preferably be present in an amount ranging from about 2 phm to about 3 phm. The water insoluble nonionic surface active agent will normally be a fatty alcohol or a nonionic surfactant.

The fatty alcohol utilized will typically be of the structural formula R—OH wherein R represents an alkyl group containing from 5 to 22 carbon atoms. In most cases, R will be an alkyl group containing from 10 to 18 carbon atoms. It is generally preferred for the fatty alcohol to contain from 12 to 14 carbon atoms. For instance, lauryl alcohol is a particularly preferred fatty alcohol.

The nonionic surfactants which can be utilized as the water insoluble nonionic surface active agent will normally have a hydrophile-lipophile balance (HLB) number of less than about 12. It is generally preferred for such nonionic surfactants to have a HLB number of less than about 10. HLB numbers are indicative of a surfactant's emulsification behavior and relate to the balance between the hydrophilic and lipophilic (hydrophobic) portions of the molecule. HLB numbers are further described in Griffin, W. C., J. Soc. Cosmet. Chem. 1, 311 (1949) which is incorporated herein by reference. The HLB number of a given surfactant generally decreases with increasing temperatures. The HLB numbers referred to herein are determined or calculated for the reaction temperature employed. Water insoluble nonionic surfactants which contain low levels (from 1 to about 8) ethylene oxide repeat units can be employed. These water insoluble nonionic surfactants can have the structural formula:

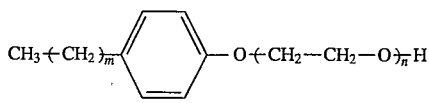

wherein n is an integer from 1 to about 8 and wherein m is an integer from about 6 to about 12. It is normally preferred for m to be 8 or 9. The HLB number of such compounds increases with increasing levels of ethylene oxide incorporation. The HLB number of such compounds increases as a function of n as follows:

| n  | HLB Number |
|----|-----------|
| 1  | 3.6       |
| 3  | 7.8       |
| 4  | 10.4      |
| 10 | 13.5      |
| 16 | 15.8      |
| 30 | 17.3      |
| 40 | 17.9      |

Polyols which are copolymers of ethylene oxide and propylene oxide can also be employed as the water insoluble nonionic surfactant. Such polyols have the structural formula:

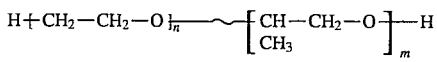

wherein n and m are integers, wherein the ratio of m to n is at least about 5:1, and wherein indicates that the distribution of monomeric units can be random. The polyols which can be used also have molecular weights of at least about 1500. The polyols which are preferred contain less than about 10% bound ethylene oxide (have a ratio of m to n of at least about 10:1).

The use of larger amounts of phosphate ester surfactants in the polymerization medium leads to better latex stability. However, the utilization of larger amounts of phosphate ester surfactants also leads to greater blushing in the ultimate coating and consequently less rust and corrosion resistance. The utilization of greater amounts of the water insoluble nonionic surface active agent leads to less latex stability, but also results in less blushing and more water resistance (less water permeability). Accordingly, it is important to balance the amounts of phosphate ester surfactant and fatty alcohol utilized in the charge composition.

The free radical aqueous emulsion polymerizations used in preparing the neutralized latex are initiated with at least one free radical generator. The free radical generator is normally employed at a concentration within the range of about 0.01 phm to about 1 phm. The free radical initiators which are commonly used include the various peroxygen compounds such as potassium persulfate, ammonium persulfate, benzoyl peroxide, hydrogen peroxide, di-t-butyl peroxide, dicumyl peroxide, 2,4-dichlorobenzoyl peroxide, decanoyl peroxide, lauryl peroxide, cumene hydroperoxide, p-menthane hydroperoxide, t-butyl hydroperoxide, acetyl peroxide, methyl ethyl ketone peroxide, succinic acid peroxide, dicetyl peroxydicarbonate, t-butyl peroxyacetate, t-butyl peroxymaleic acid, t-butyl peroxybenzoate, acetyl cyclohexyl sulfonyl peroxide, and the like; the various azo compounds such as 2-t-butylazo-2-cyanopropane, dimethyl azodiisobutyrate, azodiisobutylronitrile, 2-t-butylazo-1-cyanocyclohexane, 1-t-amylazo-1-cyanocyclohexane, and the like, the various alkyl perketals, such as 2,2-bis-(t-butylperoxy)butane, and the like. Water soluble peroxygen free radical initiators are especially useful in such aqueous polymerizations.

The emulsion polymerizations employed in making the neutralized latex are typically carried out at the temperature ranging between about 125° F. (52° C.) and 190° F. (88° C.). At temperatures above about 88° C. alkyl acrylate monomers, such as butyl acrylate, have a tendency to boil. Thus, a pressurized jacket would be required for heating such alkyl acrylate monomers to temperatures in excess of about 88° C. On the other hand, the polymerization reaction proceeds at a very slow rate at temperatures below about 52° C. The slow rate of polymerization experienced at temperatures below about 52° C. results in the polymer having a nonuniform distribution of repeat units in its backbone. The slow rates of polymerization experienced at such low temperatures are also undesirable because they greatly reduce the throughput of the polymerization reactor.

It is generally preferred for the polymerization temperature to be maintained within the range of about 150° F. (66° C.) to 180° F. (82° C.). It is generally more preferred for the reaction temperature to be controlled within the range of about 160° F. (71° C.) to about 170° F. (77° C.). It is important for the polymerization to be conducted at a pH which is below about 3.5 so that a water sensitive polymer is not produced. It is preferred for the pH of the polymerization medium to be maintained at a level of about 3.0 or less throughout the polymerization. As the polymerization proceeds, the pH of the polymerization medium will drop naturally. Thus, good results can be attained by adjusting the pH of the initial monomer charge composition to within the range of about 3.0 to about 3.5 and allowing the polymerization to proceed. In such a case the final pH of the polymerization medium will be about 1.5 which is highly satisfactory.

In commercial operations it is typically desirable to add about 15% to about 25% of the monomers in an initial charge. The initial charge is then allowed to react for a period of about 30 minutes to about 60 minutes. Then the balance of the monomers to be charged can be continuously charged into the reaction zone at a rate which is sufficient to maintain a reaction temperature within the desired temperature range. By continuously adding the monomers to the reaction medium while maintaining a relatively constant reaction temperature, very uniform polymers can be prepared.

The latex synthesized is then neutralized with ammonia to a pH within the range of about 7 to about 10.5. It is normally preferred for the latex to be neutralized to a pH within the range of 8 to 10 and more preferred for the latex to be neutralized to a pH within the range of about 9.0 to about 9.5. This can be accomplished by simply dispersing ammonia throughout the latex to produce neutralized latex.

The latex formed can be diluted with additional water to the concentration (solids content) that is desired. The latex will typically have a solids content which is within the range of about 20 percent to about 55 percent. The latex will preferably have a solids content which is within the range of about 35 percent to about 50 percent. It will more preferably have a solids content which is within the range of about 42 percent to about 46 percent. A neutralized latex which is suitable for use the making the paint formulations of this invention is sold by The Goodyear Tire & Rubber Company as Pliolite® 7104 latex. After Jan. 1, 1996, said neutralized latex will be sold as Pliotec™ 7104 latex.

In making the color imparting latex component it is generally preferred to mix from about 10 to about 50 parts by weight of the solvent into the color imparting thickener solutions. It is normally more preferred to mix from about 20 to about 30 parts by weight of the solvent into the color imparting thickener solutions. The solvent utilized can, of course, be a mixture of two or more solvents. It is preferred for the solvent to be a coalescing solvent which is at least water miscible and more preferably water soluble. Of the various solvents which can be used, generally ethylene glycol monobutyl ether, ethylene glycol monoethyl ether, diethylene glycol monomethyl ether, diethylene glycol monoethyl ether and diethylene glycol monobutyl ether are preferred.

It is generally preferred to mix from about 1 to about 10 parts by weight of a plasticizer into the color imparting thickener solutions. It is normally more preferred to mix from about 3 to about 6 parts by weight of the plasticizer into the color imparting thickener solutions. The plasticizer utilized can, of course, be a mixture of two or more plasticizers.

A wide variety of plasticizers which are compatible with paint formulations can be employed. It is desirable for the plasticizer to be a liquid at room temperature (about 25° C.) and have a sufficiently high boiling point, preferably at least 100° C., and even more preferably, at least 150° C., so that they do not volatilize from the paint formulation when applied to a substrate. Indeed, the plasticizer should enhance the water insolubility of a dried coating of the coalesced resin. Further, the plasticizer, or mixture of plasticizers, must be characterized by being compatible with the resin itself. For this characterization, a solubility parameter in the range of about 8 to about 16 is required. Such solubility parameter is of the type described in The Encyclopedia of Polymer Science and Technology, Volume 3, Page 854, 1965, John Wiley and Sons, Inc., which is simply determined by the equation $$\sigma = (\Sigma F)/V = F/MW/d$$

where

σ=solubility parameter

F=sum of the pertinent molar attraction constants of groups determined by Small, P A [(J Appl Chem 3, 71, (1953)]

V=Molar volume at 25° C.

MW=molecular weight d=density at 25° C.

Various plasticizers can be used for this purpose. They can, for example, be of the type listed in the Federation Series on Coatings Technology, Unit Twenty-two, entitled "Plasticizers," published April, 1974, so long as they fulfill the melting point, boiling point and compatibility requirements. Representative of various plasticizers are cyclic plasticizers such as phosphoric acid esters, phthalic anhydride esters and trimellitic acid esters as well as N-cyclohexyl-p-toluene sulfonamide, dibenzyl sebacate, diethylene glycol dibenzoate, di-t-octylphenylether, dipropane diol dibenzoate, N-ethyl-p-toluene sulfonamide, isopropylidenediphenoxypropanol, alkylated naphthalene, polyethylene glycol dibenzoate, o-p-toluene sulfonamide, trimethylpentanediol dibenzoate and trimethylpentanediol monoisobutyrate monobenzoate.

Representative of various acyclic plasticizers are adipic acid esters, azelaic acid esters, citric acid esters, acetylcitric acid esters, myristic acid esters, phosphoric acid esters, ricinoleic acid esters, acetylricinoleic acid esters, sebacic acid esters, stearic acid esters, epoxidized esters, as well as 1,4-butane diol dicaprylate, butoxyethyl pelargonate di[(butoxyethoxy)ethoxy] methane, dibutyl tartrate, diethylene glycol dipelargonate, diisooctyl diglycolate, isodecyl nonanoate, tetraethylene glycol di(2-ethylbutyrate), triethylene glycol di(2-ethyl-hexanoate), triethylene glycol dipelargonate and 2,2,4-trimethyl-1,3-pentane diol diisobutyrate.

Additional various plasticizers, cyclic, acyclic, and otherwise, include chlorinated paraffins, hydrogenated terphenyls, substituted phenols, propylene glycols, polypropylene glycol esters, polyethylene glycol esters, melamines, epoxidized soys, oils, melamines, liquid, hydrogenated abietate esters, epoxytallate esters, alkyl phthalyl alkyl glycolates, sulfonamides, sebacate esters, aromatic epoxies, aliphatic epoxies, liquid poly($^3$-methyl styrene), maleate esters, mellitate esters, benzoates, benzyl esters, tartrates, succinates, isophthalates, orthophthalates, butyrates, fumarates, glutarates, dicaprylates, dibenzoates and dibenzyl esters. It is to be appreciated that relatively low molecular weight polymers and copolymers derived from monoolefins containing 4 to 6 carbon atoms, mixtures of diolefins and monoolefins containing 4 to 6 carbon atoms as well as such hydrocarbons and hydrocarbon mixtures with styrene and/or $^3$-methyl styrene can also be used.

The preferred esters are prepared from the reaction of carboxylic and dicarboxylic acids including fatty acids, such as the phthalic acids, benzoic acid, dibenzoic acid, adipic acid, sebacic acid, stearic acid, maleic acid, tartaric acid, succinic acid, butyric acid, fumaric acid and glutaric acid with hydrocarbon diols, preferably saturated hydrocarbon diols, having about 7 to 13 carbon atoms.

Representative of various phosphoric acid esters are cresyl diphenyl phosphate, tricresyl phosphate, dibutyl phenyl phosphate, diphenyl octyl phosphate, methyl diphenyl phosphate, tributyl phosphate, triphenyl phosphate, tri(2-butoxyethyl) phosphate, tri(2-chloroethyl) phosphate, tri-2-(chloropropyl) phosphate and trioctyl phosphate.

Representative of various phthalic anhydride esters are butyl octyl phthalate, butyl 2-ethylhexyl phthalate, butyl n-octyl phthalate, dibutyl phthalate, diethyl phthalate, diisodecyl phthalate, dimethyl phthalate dioctyl phthalates, di(2-ethylhexyl) phthalate, diiso-octyl phthalate, di-tridecyl phthalate, n-hexyl n-decyl phthalate, n-octyl n-decyl phthalate, alkyl benzyl phthalate, bis(4-methyl-1,2-pentyl) phthalate, butyl benzyl phthalate, butyl cyclohexyl phthalate, di(2-butoxyethyl) phthalate, dicyclohexyl isodecyl phthalate, dicyclohexyl phthalate, diethyl isophthalate, di n-heptyl phthalate, dihexyl phthalate, diisononyl phthalate, di(2-methoxyethyl) phthalate, dimethyl isophthalate, dinonyl phthalate, dioctyl phthalates, dicapryl phthalate, di(2-ethylhexyl) isophthalate, mixed dioctyl phthalates, diphenyl phthalate, 2-(ethylhexyl) isobutyl phthalate, butyl phthalyl butyl glycolate, ethyl (and methyl) phthalyl ethyl glycolate, polypropylene glycol bis(amyl) phthalate, hexyl isodecyl phthalate, isodecyl tridecyl phthalate and iso-octyl isodecyl phthalate.

Representative of trimellitic acid esters are triisooctyl trimellitate, tri-n-octyl n-decyl trimellitate, trioctyl trimellitate, tri(2-ethylhexyl) trimellitate, tri-n-hexyl n-decyl trimellitate, tri-n-hexyl trimellitate, triisodecyl trimellitate and triisononyl trimellitate.

Representative of various adipic acid esters are di[2-(2-butoxyethoxy) ethyl] adipate, di(2-ethylhexyl) adipate, diisodecyl adipate, dioctyl adipates (including diisooctyl adipate) n-hexyl n-decyl adipate, n-octyl n-decyl adipate, and di-n-heptyl adipate.

Representative examples of sebacic acid esters are dibutyl sebacate, di(2-ethylhexyl) sebacate, dibutoxyethyl sebacate, diiso-octyl sebacate and diisopropyl sebacate.

Representative examples of azelaic acid esters are di(2-ethylhexyl) acelate dicyclohexyl acelate, diisobutyl azelate and diiso-octyl azelate.

It is generally preferred to mix from about 10 to about 50 parts by weight of a hectorite clay solution into the color imparting thickener solutions. It is normally more preferred to mix from about 20 to about 30 parts by weight of the hectorite clay solution into the color imparting thickener solutions. The hectorite clay solution will normally contain from about 1 weight percent to about 20 weight percent hectorite clay. It is preferred for the hectorite clay solution to contain from 5 weight percent to 15 weight percent hectorite clay and most preferred for the hectorite clay solution to contain from about 8 weight percent to 11 weight percent hectorite clay.

Hectorite clay is a swelling and gelling clay of the approximate formula $Na_{0.67}(Mg,Li)_6Si_8O_{20}(OH, F)_4$. Hectorite clay is of the montmorillonite group and is sometime also known as Strese & Hofmann's hectorite.

The multicolor paint formulation is made by mixing the color imparting latex components into a hectorite clay solution which contains from about 0.5 weight percent to about 10 weight percent clay. This hectorite clay solution will preferably contain from about 2 weight percent to 7 weight percent and more preferably from 4 weight percent to 5 weight percent hectorite clay. The weight ratio of the hectorite clay solution to the sum of the color imparting latex components will be within the range of about 1:2 to about 4:1. The weight ratio of the hectorite clay solution to the sum of the color imparting latex components will preferably be within the range of about 1:1 to about 3:1. The weight ratio of the hectorite clay solution to the sum of the color imparting latex components will more preferably be within the range of about 3:2 to about 5:2.

The multicolor paint formulations of this invention can also optionally contain fillers, stabilizers, dryers, fungicides, insecticides, antifouling agents, and anticorrosive agents. Fillers are normally inexpensive materials which are added to the paint formulation to attain the desired consistency and non-settling characteristics. Fillers can also improve a coatings physical properties, such as resistance to cracking and abrasion. Some representative examples of widely utilized fillers include chalks, clays, micas, forms of barites and talcs, and silica.

Driers are chemical compounds, such as salts of cobalt, lead, manganese, barium, and zinc, which speed up drying. Plasticizers are agents which control the hardness of the film or which impart flexibility. Stabilizers are chemical agents which neutralize the destructive effects of heat and ultraviolet light. Fungicides and insecticides are commonly added to interior and exterior house paints. Antifouling compounds are commonly added to marine paints to inhibit marine growth.

The multicolor paint formulations of this invention are comprised of from about 5 to about 30 weight percent neutralized latex (including the water in the latex), from about 0.5 to about 10 weight weight percent hectorite clay, from about 0.05 to 1 weight percent cellulosic thickener, from about 0.5 to about 10 weight percent pigments, from about 0.5 to about 10 weight percent solvents, from about 0.05 to about 2 weight percent plasticizers, and from about 37 to about 93.4 weight percent water. It is preferred for the multicolor paint formulations of this invention to contain from about 10 to about 20 weight percent neutralized latex (including the water in the latex), from about 1 to about 7 weight percent hectorite clay, from about 0.1 to 0.6 weight percent cellulosic thickener, from about 1 to about 6 weight percent pigments, from about 1 to about 6 weight percent solvents, from about 0.1 to about 1 weight percent plasticizers, and from about 60 to about 86.8 weight percent water. It is more preferred for the multicolor paint formulations of this invention to contain from about 14 to about 18 weight percent neutralized latex, from about 2 to about 5 weight percent hectorite clay, from about 0.1 to 0.4 weight percent cellulosic thickener, from about 2 to about 4 weight percent pigments, from about 2 to about 4 weight percent solvents, from about 0.3 to about 0.7 weight percent plasticizers, and from about 68 to about 79 weight percent water.

This invention is illustrated by the following examples which are merely for the purpose of illustration and are not to be regarded as limiting the scope of the invention or the manner in which it can be practiced. Unless specifically indicated otherwise all parts and percentages are given by weight.

EXAMPLE 1

In this experiment a white-red-yellow multicolor paint formulation was prepared. In the procedure employed a three thickener solutions were made by mixing 5.08 pounds of cellulosic thickener into 218 pounds of water. The pH of the thickener solutions were subsequently adjusted to a pH of 8.5 by the addition of ammonium hydroxide ($NH_4OH$) to produce pH adjusted thickener solutions.

A white color imparting thickener solution was made by mixing 72.66 pounds of titanium dioxide into the one of pH adjusted thickener solutions. A red color imparting thickener solution was made by mixing 40.00 pounds of red oxide into another one of the pH adjusted thickener solution. A yellow color imparting thickener solution was made by mixing 40.00 pounds of yellow oxide into the remaining the pH adjusted thickener solution. All three of the color imparting thickener solutions were well mixed with high speed mixing.

Color imparting latex components were made by mixing (a) 436.01 pounds of Pliolite® 7104 latex, (b) 77.03 pounds of butyl cellosolve, (c) 13.08 pounds of Santicizer™ plasticizer, and (d) 74.85 pounds of a 9.5% solution of Laponite® RDS hectorite clay in water, into each of the color imparting thickener solutions.

An aqueous phase was prepared by mixing 9.7 pounds of tetrasodium pyrophosphate and 83.83 pounds of Laponite® RDS hectorite clay into 790 pounds of water. In the mixing procedure employed the addition of tetrasodium pyrophosphate and clay was alternated with agitation being continued for 1 hour. The aqueous phase made was allowed to settle for 24 hours before use.

A multicolor paint formulation was made by mixing 100 parts of the white color imparting latex component, 100 parts of the red color imparting latex component, and 100 parts of the yellow color imparting latex component into 600 parts of the aqueous phase. The multicolor paint made was applied to substrates utilizing a dual pressure air gun with good results.

Comparative Example 2

In this experiment the procedure described in Example 1 was repeated except that Carboset 761 latex was substituted for the Pliolite® 7104 latex. However, only fine particles were attained with the pigment generally floating on the surface of the paint formulation. This experiment showed that Carboset 761 was not satisfactory for utilization in making the multicolor paint formulations of this invention.

Comparative Example 3

In this experiment the procedure described in Example 1 was repeated except that Joncryl 537 latex was substituted for the Pliolite® 7104 latex. However, a homogeneous solution which was not satisfactory for utilization in a multicolor paint formed. This experiment showed that Joncryl 537 was not satisfactory for utilization in making the multicolor paint formulations of this invention.

Comparative Example 4

In this experiment the procedure described in Example 1 was repeated except that Maincote PR71 latex was substituted for the Pliolite® 7104 latex. However, only fine particles were attained with the pigment generally floating on the surface of the paint formulation. This experiment showed that Maincote PR71 was not satisfactory for utilization in making the multicolor paint formulations of this invention.

Comparative Example 5

In this experiment the procedure described in Example 1 was repeated except that Aquamac 702 latex was substituted for the Pliolite® 7104 latex. However, the pigment floating on the surface of the paint formulation. This experiment showed that Aquamac 702 was not satisfactory for utilization in making the multicolor paint formulations of this invention.

While certain representative embodiments and details have been shown for the purpose of illustrating the subject invention, it will be apparent to those skilled in this art that various changes and modifications can be made therein without departing from the scope of the subject invention.

What is claimed is:

1. A process for preparing a multicolor paint formulation which comprises the steps of:

(1) preparing a thickener solution by mixing from about 0.5 to about 10 parts by weight of a cellulosic thickener into 100 parts by weight of water;

(2) adding a sufficient quantity of a base to the thickener solution to produce a pH adjusted thickener solution having a pH which is within the range of about 7.5 to about 12;

(3) dispersing from about 15 to about 90 parts by weight of a first pigment into 100 parts by weight of the pH adjusted thickener solution to produce a first color imparting thickener solution;

(4) mixing about 50 to about 300 parts by weight of a neutralized latex, from about 5 to about 80 parts by weight of a solvent, from about 0.5 to about 20 parts by weight of a plasticizer, and from about 5 to about 80 parts by weight of an aqueous hectorite clay solution, into the first color imparting thickener solution to produce a first color imparting latex component; wherein said aqueous hectorite clay solution contains from about 1 to about 20 weight percent clay; and wherein said neutralized latex is made by a method which comprises (A) free radical aqueous emulsion polymerizing at a pH of less than about 3.5 a monomer mixture which comprises, based on 100 weight percent monomers: (a) from about 45 to about 85 weight percent vinyl aromatic monomers, (b) from about 15 to about 50 weight percent of at least one alkyl acrylate monomer, and (c) from about 1 to about 6 weight percent of at least one unsaturated carbonyl compound; in the presence of about 0.5 to 4.0 phm at least one phosphate ester surfactant and in the presence of about 0.5 to 4.0 phm of at least one water insoluble nonionic surface active agent to produce a latex, and (B) neutralizing the latex with ammonia to a pH which is within the range of about 7 to about 10.5 to produce the neutralized latex;

(5) dispersing from about 15 to about 90 parts by weight of a second pigment into 100 parts by weight of the pH adjusted thickener solution to produce a second color imparting thickener solution;

(6) mixing about 50 to about 300 parts by weight of a neutralized latex, from about 5 to about 80 parts by weight of a solvent, from about 0.5 to about 20 parts by weight of a plasticizer, and from about 5 to about 80 parts by weight of an aqueous hectorite clay solution, into the second color imparting thickener solution to produce a second color imparting latex component; wherein said aqueous hectorite clay solution contains from about 1 to about 20 weight percent clay; and wherein said neutralized latex is made by a method which comprises (A) free radical aqueous emulsion polymerizing at a pH of less than about 3.5 a monomer mixture which comprises, based on 100 weight percent monomers: (a) from about 45 to about 85 weight percent vinyl aromatic monomers, (b) from about 15 to about 50 weight percent of at least one alkyl acrylate monomer, and (c) from about 1 to about 6 weight percent of at least one unsaturated carbonyl compound; in the presence of about 0.5 to 4.0 phm at least one phosphate ester surfactant and in the presence of about 0.5 to 4.0 phm of at least one water insoluble nonionic surface active agent to produce a latex, and (B) neutralizing the latex with ammonia to a pH which is within the range of about 7 to about 10.5 to produce the neutralized latex; and (7) mixing the first color imparting latex component and the second color imparting latex component into a second hectorite clay solution to produce the multicolored paint formulation; wherein the second hectorite clay solution contains from about 0.5 to about 10 weight percent hectorite clay, wherein the weight ratio of the second hectorite clay solution to the sum of the first color imparting latex component and the second color imparting latex component is within the range of about 1:2 to about 4:1.

2. A process as specified in claim 1 wherein the thickener solution is prepared by mixing from about 1 to about 5 parts by weight of the cellulosic thickener into 100 parts by weight of water.

3. A process as specified in claim 2 wherein the pH is adjusted in step (2) to be within the range of about 8 to about 10.

4. A process as specified in claim 3 wherein from about 25 to about 40 parts by weight of the first pigment is dispersed into 100 parts by weight of the pH adjusted thickener solution in step (3), and wherein from about 25 to about 40 parts by weight of the second pigment is dispersed into 100 parts by weight of the pH adjusted thickener solution in step (5).

5. A process as specified in claim 4 wherein from about 100 to about 200 parts of the neutralized latex, from about 10 to about 50 parts of the solvent, from about 1 to about 10 parts of the plasticizer, and from about 10 to about 50 parts of the aqueous hectorite clay solution are mixed into the first color imparting thickener solution to produce the first color imparting latex component; and wherein from about 100 to about 200 parts of the neutralized latex, from about 10 to about 50 parts of the solvent, from about 1 to about 10 parts of the plasticizer, and from about 10 to about 50 parts of the aqueous hectorite clay solution are mixed into the second color imparting thickener solution to produce the second color imparting latex component.

6. A process as specified in claim 5 wherein the aqueous hectorite clay solution employed in step (4) contains from about 5 weight percent to about 15 weight percent hectorite clay; and wherein the aqueous hectorite clay solution employed in step (6) contains from about 5 weight percent to about 15 weight percent hectorite clay.

7. A process as specified in claim 6 wherein the second hectorite clay solution utilized in step (7) contains from about 2 to about 7 weight percent hectorite clay.

8. A process as specified in claim 7 wherein the weight ratio of the second hectorite clay solution to the sum of the first color imparting latex component and the second color imparting latex component is within the range of about 1:1 to about 3:1.

9. A process as specified in claim 8 wherein the thickener solution is prepared by mixing from about 2 to about 3 parts by weight of the cellulosic thickener into 100 parts by weight of water; wherein the pH is adjusted in step (2) to be within the range of about 8.3 to about 8.7; wherein from about 30 to about 35 parts by weight of the first pigment is dispersed into 100 parts by weight of the pH adjusted thickener solution in step (3); and wherein from about 30 to about 35 parts by weight of the second pigment is dispersed into 100 parts by weight of the pH adjusted thickener solution in step (5).

10. A process as specified in claim 9 wherein from about 125 to about 175 parts of the neutralized latex, from about 20 to about 30 parts of the solvent, from about 3 to about 6 parts of the plasticizer, and from about 20 to about 30 parts of the aqueous hectorite clay solution are mixed into the first color imparting thickener solution to produce the first color imparting latex component; and wherein from about 125 to about 175 parts of the neutralized latex, from about 20 to about 30 parts of the solvent, from about 3 to about 6 parts of the plasticizer, and from about 20 to about 30 parts of the aqueous hectorite clay solution are mixed into the second color imparting thickener solution to produce the second color imparting latex component.

11. A process as specified in claim 10 wherein the aqueous hectorite clay solution employed in step (4) contains from about 8 weight percent to about 11 weight percent hectorite clay; and wherein the aqueous hectorite clay solution employed in step (6) contains from about 8 weight percent to about 11 weight percent hectorite clay.

12. A process as specified in claim 11 wherein the second hectorite clay solution utilized in step (7) contains from about 4 to about 5 weight percent hectorite clay; and wherein the weight ratio of the second hectorite clay solution to the sum of the first color imparting latex component and the second color imparting latex component is within the range of about 3:2 to about 5:2.

13. A process as specified in claim 12 wherein the first pigment is titanium dioxide.

14. A process as specified in claim 12 wherein the solvent is a coalescing solvent.

15. A process as specified in claim 14 wherein the coalescing solvent is selected from the group consisting of ethylene glycol monobutyl ether, ethylene glycol monoethyl ether, diethylene glycol monomethyl ether, diethylene glycol monoethyl ether and diethylene glycol monobutyl ether.

16. A process as specified in claim 1 which further comprises the steps of: (i) dispersing from about 15 to about 90 parts by weight of a third pigment into 100 parts by weight of the pH adjusted thickener solution to produce a third color imparting thickener solution; (ii) mixing about 50 to about 300 parts by weight of a neutralized latex, from about 5 to about 80 parts by weight of a solvent, from about 0.5 to about 20 parts by weight of a plasticizer, and from about 5 to about 80 parts by weight of an aqueous hectorite clay solution, into the third color imparting thickener solution to produce a third color imparting latex component; wherein said aqueous hectorite clay solution contains from about 1 to about 20 weight percent clay; and wherein said neutralized latex is made by a method which comprises (A) free radical aqueous emulsion polymerizing at a pH of less than about 3.5 a monomer mixture which comprises, based on 100 weight percent monomers: (a) from about 45 to about 85 weight percent vinyl aromatic monomers, (b) from about 15 to about 50 weight percent of at least one alkyl acrylate monomer, and (c) from about 1 to about 6 weight percent of at least one unsaturated carbonyl compound; in the presence of about 0.5 to 4.0 phm at least one phosphate ester surfactant and in the presence of about 0.5 to 4.0 phm of at least one water insoluble nonionic surface active agent to produce a latex, and (B) neutralizing the latex with ammonia to a pH which is within the range of about 7 to about 10.5 to produce the neutralized latex; wherein the third color imparting latex component is mixed into the second hectorite clay solution in step (7); and wherein the weight ratio of the second hectorite clay solution to the sum of the first color imparting latex component, the second color imparting latex component, and the third color imparting latex component is within the range of about 1:2 to about 4:1.

* * * * *